United States Patent [19]

Russomano

[11] Patent Number: 4,611,950
[45] Date of Patent: Sep. 16, 1986

[54] METHOD AND APPARATUS FOR REMOVING CONTAMINANTS FROM SOIL

[75] Inventor: Richard J. Russomano, Chatham, N.J.

[73] Assignee: Foster Wheeler Energy Corporation, Livingston, N.J.

[21] Appl. No.: 653,101

[22] Filed: Sep. 21, 1984

[51] Int. Cl.⁴ .............................................. G21F 9/20
[52] U.S. Cl. .................................... 405/128; 210/170; 405/36; 405/52
[58] Field of Search ................ 405/128, 129, 52, 258, 405/36–43; 210/170, 194, 273, 241; 252/633

[56] References Cited

U.S. PATENT DOCUMENTS

| | | | |
|---|---|---|---|
| 3,425,555 | 2/1969 | Ridgeway | 405/258 |
| 3,859,799 | 1/1975 | Jaco | 405/128 |
| 4,362,434 | 12/1982 | Valiga et al. | 252/633 X |
| 4,448,690 | 5/1984 | Maphis | 210/609 |
| 4,449,849 | 5/1984 | Horn et al. | 405/52 |

FOREIGN PATENT DOCUMENTS

2524351  7/1983  France ................................ 405/128

*Primary Examiner*—Dennis L. Taylor
*Attorney, Agent, or Firm*—Marvin A. Naigur; John E. Wilson; Warren B. Kice

[57] ABSTRACT

An apparatus and method for removing contaminants from soil in situ or at a remote location in which removal is accomplished by pumping a supply of uncontaminated water via a distribution conduit system to a series of spray nozzles. The spray nozzles are used to flood the surface of the contaminated soil with the supply water, which soaks into soil and mixes with the contaminants. The mixed water and contaminants travel through the soil to a set of vertical inlet risers positioned in the soil and located at a distance from the spray nozzles. The water-contaminant mixture is drawn through the inlet risers via a collection conduit system to a holding tank from when the water is taken for removal of the contaminants. The water is drawn through the inlet risers by producing a high velocity stream of water using a venturi device and passing the stream over the upper end of the removal conduit. The vacuum created by the high velocity stream causes the water in the inlet riser to flow into the removal conduit system.

9 Claims, 6 Drawing Figures

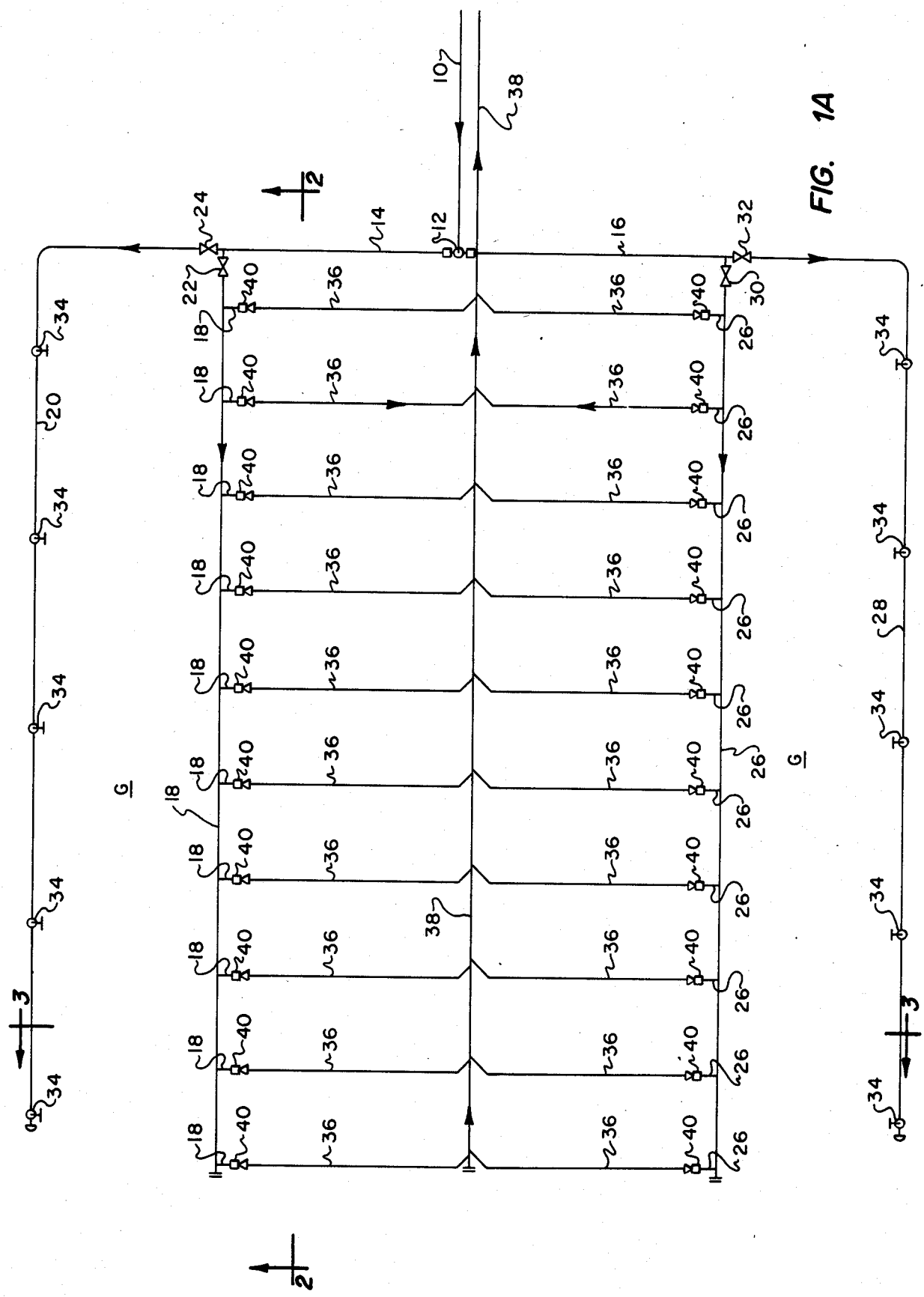

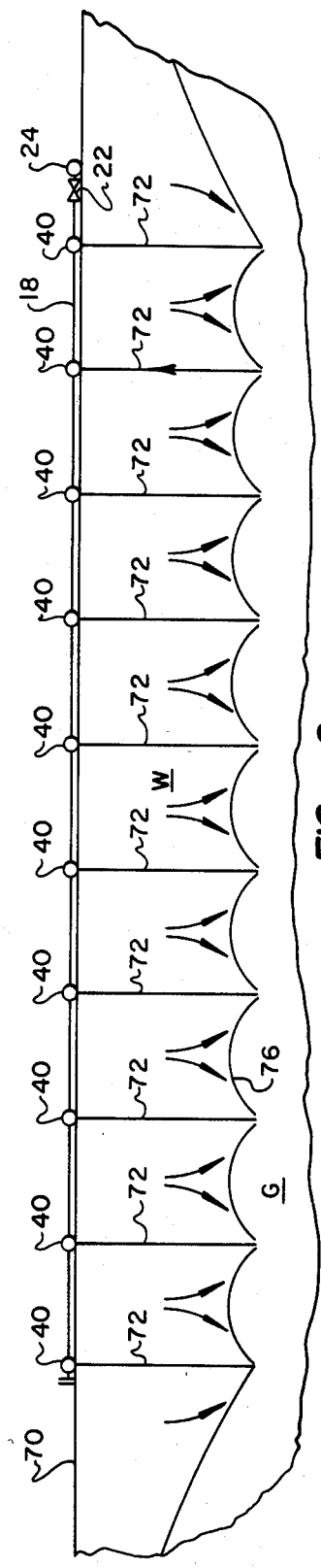
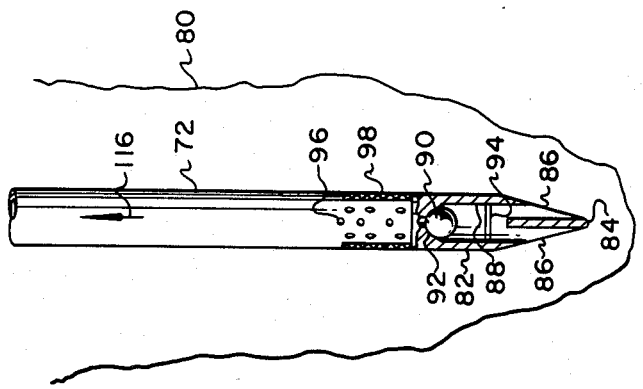
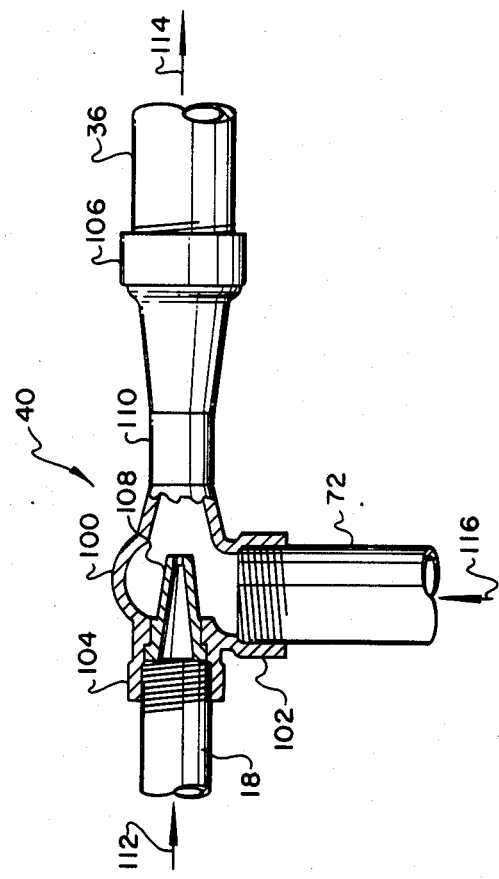
FIG. 2
FIG. 4
FIG. 5

METHOD AND APPARATUS FOR REMOVING CONTAMINANTS FROM SOIL

BACKGROUND OF THE INVENTION

This invention relates to a contamination removal apparatus and method and, more particularly, to such an apparatus and method for removing contaminants from soil in situ or at a remote site.

In cases where there are spills of contaminants, such as toxic materials, hydrocarbon materials, chemical wastes, etc., into or onto the ground, the materials will contaminate the surrounding ground water through action of the natural movement of water through the ground. If the spills are not isolated and the contaminants somehow removed, they will spread beyond the original spill area through the ground water system, thereby endangering water supplies. Although, in view of the above, it is highly desirable to remove the contaminants from the area, few options are available. In some cases, physical removal and disposal or treatment of the soil is required. Alternatively, the spill site may be isolated to a depth below which the spill has traveled via ground water action, and the contaminants retained in this area of ground isolated from surrounding areas. However, these methods are very expensive and do not eliminate the contaminants.

OBJECTS AND SUMMARY OF THE INVENTION

It is therefore an object of the present invention to provide a system and method of the above type in which contaminants are removed from the ground in an efficient, yet relatively inexpensive, manner.

It is a further object of the present invention to provide a system for removing contaminants from the ground either in situ or at a remote site.

It is a further object of the present invention to provide a system and method of the above type in which water is pumped into the ground for mixing with the contaminants and facilitating their removal from the ground.

It is a further object of the present invention to provide a system and method of the above type in which the contaminants are removed from the water before the latter is circulated back into the system.

Toward the fulfillment of these and other objects, according to the system and method of the present invention, water is selectively circulated through a first and second conduit system located in the area of the soil to be decontaminated. Water is discharged from the first conduit system to the soil so that the water can enter the soil and form a mixture with the contaminants. The mixture of water and contaminants are removed from the soil in response to the flow of water in the second conduit system.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which:

FIG. 1A is a diagramatic plan view of the water injection and removal portion of the system of the present invention;

FIG. 2 is a cross-sectional view of the water injection and removal portion of the present invention shown in FIG. 1A taken along section line 2—2;

FIG. 4 is an enlarged, partial elevational view depicting details of the lower portion of the inlet risers schematically depicted in FIG. 1A; and FIG. 5 is an enlarged, partial elevational view depicting details of the upper portion of the inlet risers and associated collection conduits schematically depicted in FIG. 1A.

DESCRIPTION OF THE PREFERRED EMBODIMENTS

Figure 1B:
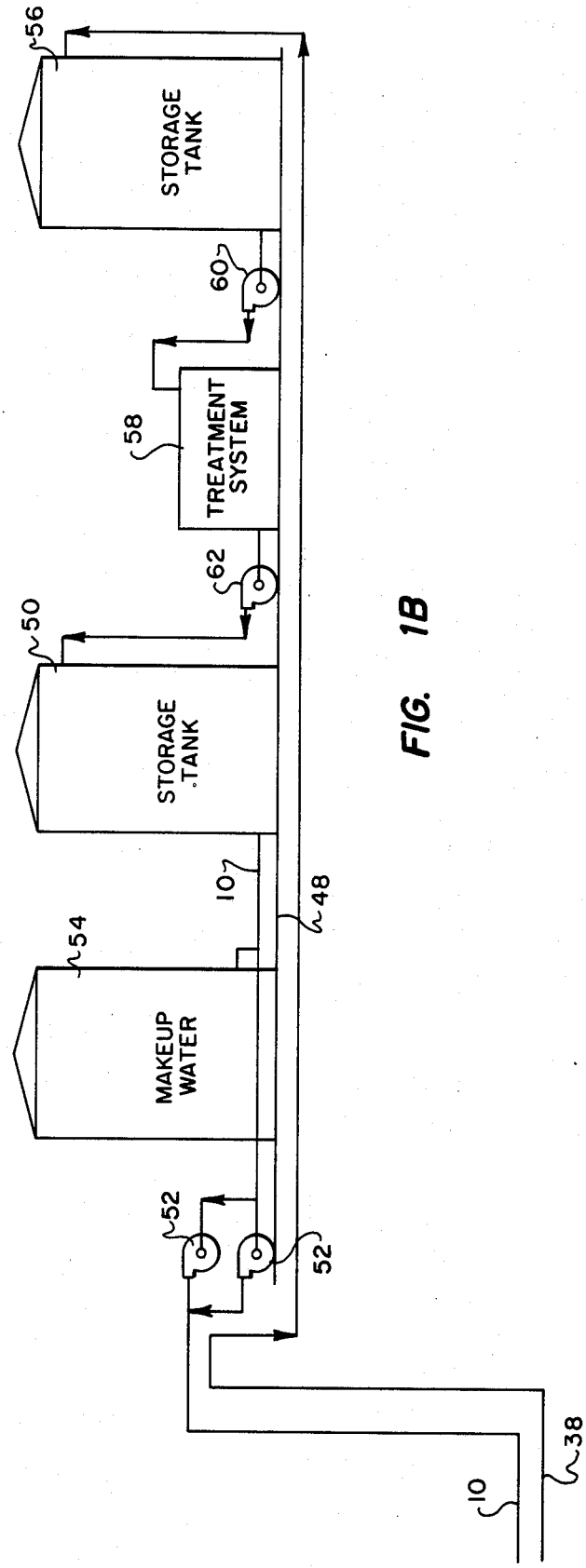
FIG. 1B is a diagramatic elevational view of the water supply and treatment portion of the system of the present invention for use in connection with the water injection and removal portion shown in FIG. 1A.

Referring to FIGS. 1A and 1B of the drawings, there is shown a single-field decontamination process system. In general the system comprises a water injection and removal portion shown in FIG. 1A and a water supply and treatment shown in FIG. 1B.

Referring first to FIG. 1A, the water injection and removal portion of the system is shown positioned in and on a section of contaminated ground, or soil, G. Fresh water used for decontaminating soil G enters through a main supply header 10 from the water supply and treatment portion shown in FIG. 1B described hereinbelow. Main supply header 10, and all other headers hereinafter described preferably comprise conduits of standard design and of a size selected for the carriage capacity required for the particular application. The supply water is split into two streams by a tee joint 12 connected to main supply header 10 and to supply cross headers 14 and 16. Supply cross header 14 is connected to an eductor supply header 18 and a sprayer supply header 20 through block valves 22 and 24, respectively.

Correspondingly, supply cross header 16 is connected to another eductor supply header 26 and a sprayer supply header 28 through block valves 30 and 32, respectively. Sprayer supply headers 20 and 28 are connected to a series of spray nozzles 34, which are positioned and adjusted to flood the entire area of ground G which is to be decontaminated. Although five spray nozzles 34 are shown connected to each of sprayer supply headers 20 and 28, it should be understood that any number could be used, the exact number being dependent upon a number of factors including the surface area of ground G that is to be flooded and decontaminated.

Eductor supply headers 18 and 26 are connected to a series of return cross headers 36 which, in turn, are connected to a return header 38. Return header 38 returns the used water to the water supply and treatment portion of the system shown in FIG. 1B, as will be explained. Each of return cross headers 36 has connected therein an eductor 40, or other similar venturi device. Each of eductors 40 is connected to the upper ends of a series of inlet risers, which are not visible in FIG. 1A and which will be more fully described in connection with FIG. 5. In the embodiment illustrated in FIG. 1A, a total of ten eductors 40 and return cross headers 36 is shown connected to each of eductor supply headers 18 and 26, but it should be understood that any number might be used. The exact number of such eductors and return cross headers is dependent upon a number of factors including the area of ground G to be decontaminated. The relationship between the number of eductors and spray nozzles 34 is illustrated to be in a ratio of 2:1, although the exact ratio may be dependent upon factors such as the type of soil comprising ground G and the type of contaminant that is to be removed.

All of supply cross headers 14 and 16, sprayer supply headers 20 and 28, eductor supply headers 18 and 26, return cross headers 36, and return header 38 are preferably positioned on or slightly above the surface of ground G. Sprayer supply headers 20 and 28 and spray nozzles 34 may be elevated sufficiently to provide sprayer coverage of the area of ground G that is to be decontaminated.

Referring now to FIG. 1B, the water supply and treatment portion of the system is connected between supply header 10 and return header 38. Fresh water is stored in a storage tank 50 standing on the earth surface 48 and is supplied to the water injection and removal portion of the system of FIG. 1A from storage tank 50 through header 10. The fresh water is circulated throughout the system by pumps 52, which may be connected in parallel in header 10. The number, size, and types of pumps 52 is dependent upon the particular application, including the depth to which contamination removal is desired.

Also connected to header 10 on the outlet side of storage tank 50 is a makeup water tank 54, whose purpose is to replace any water lost in the decontamination process if required. Connected to the inlet side of storage tank 50 is a water reclaiming apparatus for treating water recirculated from the water injection and removal portion of the system of FIG. 1A. The water reclaiming apparatus comprises a storage tank 56 for holding contaminated water returned through header 38 and a water treatment system 58 connected to the outlet thereof. Water treatment system 58 may be of the type disclosed in U.S. Pat. No. 3,947,327, the disclosure of which is hereby incorporated by reference. Water from contaminated water storage tank 56 is circulated through water treatment system 58 by means of transfer pumps 60 and 62 which may be connected in the conduit between storage tank 56 and treatment system 58 and between treatment system 58 and storage tank 50. It should be understood that the previously described storage tanks could be replaced with sealed ponds without departing from the scope of the invention.

Figure 3:
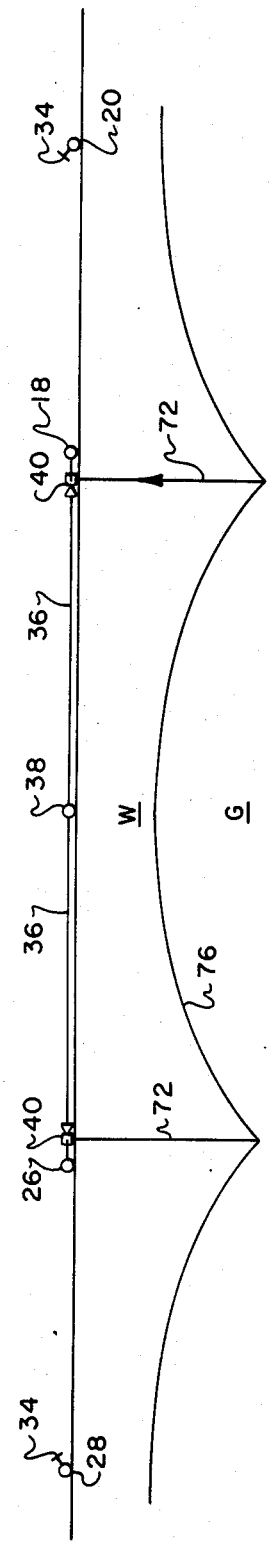
FIG. 3 is a cross-sectional view of the water injection and removal portion of the present invention shown in FIG. 1A taken along section line 3—3.

Referring to FIGS. 2 and 3, a plurality of eductors 40 are connected to return cross headers 36 and to a corresponding number of inlet risers 72 positioned in the ground G. Inlet risers 72 are connected to eductors 40 generally perpendicular to eductor supply header 18. Inlet risers 72 and eductors 40 are preferably spaced more or less equidistantly to provide uniform removal of contaminated water from the ground G. Inlet risers 72 are of sufficient length to reach the maximum depth of soil contamination and are perforated on their lower ends to permit the entry of water, as will be discussed later. The particular arrangement illustrated contemplates that risers 72 would be sunk into the contaminated area to a depth of about 25 feet.

Referring now to FIG. 4, the lower end of each inlet riser 72 is shown positioned in ground G. Risers 72, which are preferably of standard design, may be inserted into ground G by water jetting in a manner to be described later, which creates a hole 80 of irregular size and shape. The lower end portion 82 of each inlet riser 72 is tapered to a point 84 to permit easy entry into ground G, and point 84 has defined therein a plurality of longitudinal slots 86 which permit the exit of water from inlet riser 72 under circumstances to be described. Above slots 86 in a channel 88 is a valve assembly comprising a ball 90, an upper valve seat 92 and a lower valve seat 94. Above the valve assembly, inlet riser 72 has a plurality of radially-extending perforations 96 limited to a small portion of the length of inlet riser 72 on the lower end thereof. The perforations are surrounded by a screen 98 whose purpose is to prevent the entry of soil, rocks and other large particulate materials.

Inlet risers 72 are constructed to permit easy installation into ground G by jetting action. According to this method a source of pressurized water is connected to the upper end of the inlet riser 72, and the water flows downwardly through inlet riser 72. The flow of water forces ball 90 downwardly onto valve seat 94, which is constructed to permit passage of water therearound. The water then passes through slots 86 and into the ground G, and a sufficient amount of soil is removed to create a hole 80 to permit insertion of the riser 72.

Referring to FIG. 5, the jet eductor 40 connected atop each inlet riser 72 is shown in detail. Eductor 40, which may be of a standard design, is generally shaped as a fully enclosed tee connector 100, which is connected to inlet riser 72 by means of a threaded connection 102 and between two sections of cross header 36 and supply header 18 or 26 by means of a threaded connections 106 and 104 on one end thereof. Disposed in the branch of tee connector 100 that is connected to eductor supply header 18 or 26 is a nozzle 108. Nozzle 108 is positioned with its longitudinal axis generally perpendicular to the axis of inlet riser 72, and the outlet of nozzle 108 extends across the upper end of inlet riser 72. The branch of tee connector 100 that is connected to the section of cross header 36 is an elongated section having a reduced diameter section which defines a venturi 110. It should be understood that, while an eductor is described for use in connection with the invention, any equivalent venturi device could be utilized; and the term eductor should be read as including all such equivalent devices.

In operation, fresh water from storage tank 50, and from makeup water tank 54, if required, is circulated through conduit 10 by means of pumps 52 to supply cross headers 14 and 16. Initially, block valves 22 and 30 are closed and block valves 24 and 32 are opened. This directs the fresh water through sprayer supply headers 20 and 28 to spray nozzles 34, which uniformly floods the area of ground G to be decontaminated. The water thus sprayed on the surface soaks into the ground G and mixes with the contaminants, creating a water table W in ground G down to the level indicated by the numeral 76 (FIGS. 2 and 3).

When flooding of ground G is completed, block valves 22 and 30 are opened, and block valves 24 and 32 are closed, thereby ceasing the flow of fresh water into sprayer supply headers 20 and 28, and redirecting the fresh water into eductor supply headers 18 and 26.

The water thus supplied by eductor supply headers 18 and 26 passes through nozzle 108 in each eductor 40 as shown by arrow 112 in FIG. 5. Nozzle 108 forms a high velocity stream of water that is directed through venturi section 110 and into the corresponding cross header 36 as indicated by arrow 114. The passage of the stream of water through venturi section 110 causes a drop in pressure due to the venturi effect. The reduced pressure inside tee connector 100 is transmitted into the corresponding inlet riser 72 causing the higher pressure water-contaminant mixture to migrate through the ground G toward riser 72.

Referring to FIG. 4, the water-contaminant mixture flows from ground G, into hole 80, thence through perforations 96 in the lower portion of each riser 72, and finally upwardly inside riser 72 as indicated by arrow 116. The mixture thus removed from ground G mixes with the fresh water exiting from nozzle 108 and passes into cross header 36 as shown in FIG. 5.

Initially, a portion of the ground water also flows through slots 86 of each riser 72, which causes ball 90 to rise and seal against upper valve seat 92. Thereafter ground water can enter risers 72 only through perforations 96. Perforations 96 are limited to only a small length at the lower end of riser 72 in order to force water to travel downwardly from the ground surface as well as laterally between the risers 72. This dual flow activity enhances the flushing action of the water.

The mixture of water and contaminants thus removed from the soil through risers 72 passes through the remaining sections of return headers 36 and into the main return header 38. The mixture then passes from main return header 38 into storage tank 56, from which it is moved by pump 60 into treatment system 58 where contaminants are removed from the water. The contaminants removed by treatment system 58 may be disposed of by any one of several methods well known in the art. The decontaminated water emanating from treatment system 58 then moves into fresh water storage tank 50 by means of pump 62, from whence the water movement cycle begins again.

It should be understood that the pattern of headers described in FIG. 1 could be altered for a particular application, and any number of sprayer supply headers and eductor supply headers could be used in combination with each other. Further, the cycling of block valves 22, 24, 30 and 32 to alternately direct the fresh water to either the sprayer supply headers 20 and 28 or the eductor supply headers 18 and 26 is optimized for maximum passage of water from spray nozzles 34, through ground G and into the eductors 40. This depends upon a number of factors, including the type of soil and the type contaminant to be removed.

The foregoing system may be used to remove contaminants either in situ or at a remote decontamination site. In the latter case a particular volume of earth would be evacuated from a given area, and a pit would be formed and lined with clay, concrete, or the like. The system of the present invention would be installed in the pit to decontaminate soil that is placed in the pit for treatment. The decontaminated material could then be removed to another location after the decontamination operation has been completed and additional contaminated material could be placed in the pit.

While particular embodiments of the invention have been shown and described, it is clear that changes and modifications could be made thereto without departing from the true scope and spirit of the invention. It is the intention of the applicant that the appended claims be construed broadly to cover all such changes and modifications.

What is claimed is:

1. An apparatus for removing contaminants from soil comprising:
   a source of water,
   a first and a second conduit system;
   means connected to said water source for selectively circulating water to said first and second conduit systems;
   means connected to the first conduit system for discharging water flowing through said first conduit system to said soil to form a mixture of contaminants and water;
   means connected to the second conduit system for continuously circulating said water through said second conduit system; and
   venturi means in said second conduit system for creating a reduced pressure in a portion of said second conduit means in response to said continuous circulation for drawing said mixture from said soil into said second conduit system for continuous circulation therethrough.

2. Apparatus in accordance with claim 1 wherein said selective circulating means comprises piping means connected to said first and second conduit systems and valve means associated with said piping means.

3. Apparatus in accordance with claim 2 further comprising means connected to said piping means for removing the contaminants from said mixture.

4. Apparatus in accordance with claim 1 wherein said venturi means comprises an eductor.

5. Apparatus in accordance with claim 1 wherein said venturi means further includes a perforated tube positioned in said soil.

6. Apparatus in accordance with claim 5 wherein said perforations in said tube are on the lower end thereof.

7. Apparatus in accordance with claim 1 wherein said discharging means comprises at least one spray nozzle.

8. A method for removing contaminants from soil comprising the steps of:
   selectively introducing water from a single source to a first and second conduit system;
   discharging said water flowing through said first conduit system to said soil to form a mixture of contaminants and water;
   continuously circulating said water through said second conduit system; and
   creating a reduced pressure in a portion of said second conduit means in response to said continuous circulation for drawing said mixture from said soil into said second conduit system for continuous circulation therethrough.

9. The method of claim 8 further comprising the steps of treating said mixture during the continuous circulation thereof to remove said contaminates therefrom.

* * * * *